United States Patent [19]

Jin

[11] Patent Number: 5,466,496
[45] Date of Patent: Nov. 14, 1995

[54] LIQUID CRYSTAL-DISPERSED POLYMERIC FILM

[75] Inventor: Yong W. Jin, Seoul, Rep. of Korea

[73] Assignee: Samsung Electron Devices Co., Ltd., Kyunggi, Rep. of Korea

[21] Appl. No.: 227,060

[22] Filed: Apr. 13, 1994

Related U.S. Application Data

[63] Continuation-in-part of Ser. No. 982,868, Nov. 30, 1992, abandoned.

[30] Foreign Application Priority Data

Nov. 30, 1991 [KR] Rep. of Korea .................. 91-21869

[51] Int. Cl.$^6$ .................................................. C09K 19/44
[52] U.S. Cl. .................. 428/1; 252/299.01; 252/299.64; 252/299.65; 524/288; 524/289; 524/292; 524/544; 524/551; 524/555; 522/173; 522/181; 522/182
[58] Field of Search .......................... 428/1; 252/294.01, 252/299.64, 299.65; 524/288, 289, 292, 544, 551, 555; 522/173, 181, 182

[56] References Cited

U.S. PATENT DOCUMENTS

| | | | |
|---|---|---|---|
| 4,673,255 | 6/1987 | West et al. | 350/347 V |
| 4,994,204 | 2/1991 | Doane et al. | 252/299.01 |
| 5,011,674 | 4/1991 | Yamagishi et al. | 252/299.5 |

OTHER PUBLICATIONS

H–S. Kitzerow, et al. (1992) Appl. Phys. Lett. 60(25) Jun. 22, 1992, pp. 3093–3095, "Linear electro–optic effects in polymer–dispersed ferroelectric liquid crystals".

H. Molsen, et al. (1992) Jpa. J. Appl. Phys. 31, pp. L1083–L1085, Part 2, No. 8A, Aug. 1, 1992, "Antiferro-electric Switching in Polymer–Dispersed Liquid Crystals".

*Primary Examiner*—Mark Naguno
*Attorney, Agent, or Firm*—Steinberg, Raskin & Davidson

[57] ABSTRACT

Liquid crystal films which are stable to light, moisture and heat, and which have an improved response time and viewing angle are provided by combining ferroelectric liquid crystals and a polymer matrix. The invention further provides for liquid crystal display elements utilizing the liquid crystal films of the invention. Still further, the invention provides methods of producing the liquid crystal films. According to the invention, liquid crystalline polymers having optical anisotropy as a polymer matrix and functional side chain radicals having an asymmetric carbon atom and dipole moment in the polymer matrix are matched with the dipole moment of the ferroelectric crystals.

12 Claims, No Drawings

LIQUID CRYSTAL-DISPERSED POLYMERIC FILM

CROSS REFERENCE TO RELATED APPLICATION

This is a continuation-in-part of my application Ser. No. 07/982,868, filed Nov. 30, 1992, now abandoned.

FIELD OF THE INVENTION

The present invention relates to polymeric films having liquid crystal compounds dispersed therein, and more particularly to such films which are stable to light, moisture and heat and which also have improved response speed and viewing angle, due to a combination of ferroelectric liquid crystal compounds and a polymer matrix. The invention further relates to a process of preparing such films.

BACKGROUND OF THE INVENTION

Liquid crystals are substances in liquid state and they show optical anisotropy like a crystal. Optical properties of the liquid crystals vary with a change of molecular arrangement by exterior stimulations such as an electric field, magnetic field, temperature, pressure, and the like. Various display elements, for example, electronic calculators, sensors, computers, televisions, transmission-type optical valves, etc. have been developed by using such properties of the liquid crystals.

Liquid crystal display elements can be fabricated to be more compact, provide larger screens and lower electric power consumption compared with the conventional Braun tube mode display elements. Accordingly, it is expected that liquid crystal display elements will become the main display elements in the relevant technical fields in the near future.

Conventional liquid crystal display elements include the twisted nematic (TN) display element and the supertwisted nematic (STN) display element, and the like. However, since such nematic liquid crystal display elements have low response speed and difficulties in demonstrating the gray scale, they are not used in forming large screens and in applications requiring a dynamic picture display. Therefore, smectic liquid crystals have been used in the display elements.

Among the smectic liquid crystals both the smectic A phase and the smectic C phase have a low degree of freedom. The liquid crystal of chiral smectic C phase has an asymmetric carbon atom which generates polarization when dipole moment is directed to one direction.

The resulting polarization is called spontaneous polarization. The liquid crystal with high spontaneous polarization is called a ferroelectric liquid crystal, which can be rapidly reversed by the polar change of exterior electromagnetic fields, and thus, has a high response time to present a dynamic picture, and also has high contrast and wide viewing angle. Therefore, it can be utilized as a direct view-type display element.

However, since the ferroelectric liquid crystal has poor chemical stability against light, moisture and heat, it is not well used in commercial applications.

In order to solve such defects, biphenyl ester-based or pyrimidine-based liquid crystals have been developed. However, they cannot satisfy the desired levels. Liquid crystal display elements can be prepared by dispersing liquid crystalline compounds in polymeric materials and changing the temperature or solubility of the resulting dispersion, curing the dispersion to form a film, and then sandwiching the film between glass plates coated with indium-tin oxides (ITO).

In the display elements, since the refractive index of the polymeric materials is different from that of the liquid crystals in the form of droplets, when light passes through the display elements, the incident light is scattered, so that the display elements are opaque.

However, when electric voltages are applied to the ITO glass plates, the liquid crystal droplets are aligned with the polymeric materials in the same direction, and thus, the light passes through. Accordingly, an image display is possible due to the change of light by the liquid crystals.

However, the conventional nematic liquid crystal display elements have various problems when used as a direct view-type.

That is, when electric voltages are applied, since the arrangement time from horizontal direction to vertical direction against electrodes requires more than several hundred msec, the response time is slow, and thus, there is difficulty in showing a dynamic picture. Also, when the liquid crystals are aligned, since the viewing angle is narrow, there is difficulty in watching the display screen from an off center direction.

Since the display elements using ferroelectric liquid crystals have high dielectric anisotropy and spontaneous polarization, due to the SmC phase having an asymmetric carbon atom in smectic liquid crystals, when electric voltages are applied thereto, the same have a rapid response time of not more than several hundred msec and a wide viewing angle. However, spontaneous polarization, viewing angle and response time rapidly decrease, or liquid crystalline properties become unstable, due to light, moisture or an increase in temperature. Furthermore, it is difficult to realize gray scale for coloration, to obtain homogeneous alignment, to control cell gap, and to obtain resistance against outside impact.

SUMMARY OF THE INVENTION

Accordingly, it is a primary object of the present invention to provide a liquid crystal film which is stable to light, moisture and heat and has an improved response time and viewing angle by the use of a combination of ferroelectric liquid crystals and a polymer matrix.

It is another object of the present invention to provide liquid crystal display elements comprising the liquid crystal films of the present invention.

It is yet another object of the present invention to provide a method of producing the liquid crystal films of the invention.

In the present invention, the stability and convenience in treating the liquid crystals, as well as the fast response time and wide viewing angle of the liquid crystals, are achieved by dispersing ferroelectric liquid crystals in a polymer matrix to form small droplets, and curing the matrix to envelop the liquid crystal phase. The improved fast response time particularly is achieved by the selection of liquid crystalline polymers having optical anisotropy as a polymer matrix, the presence of functional side chain radicals having an asymmetric carbon atom and dipole moment in the polymer matrix, and the match of the dipole moment of the polymer matrix with that of the ferroelectric liquid crystals.

The liquid crystal-dispersed polymeric film of the present invention having improved response time and viewing angle can be prepared by dispersing ferroelectric liquid crystals of the general formula (II) or (III) as liquid crystals in a polymer matrix of the general formula (I) as high molecular weight materials.

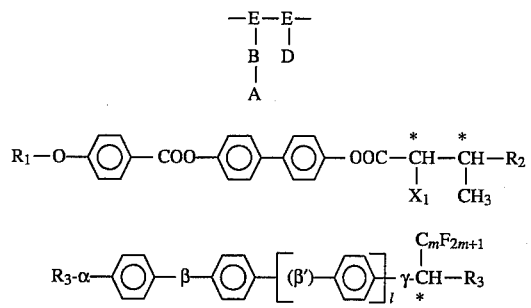

$\overset{*}{C}$ stands for asymmetric carbon;
wherein E stands for

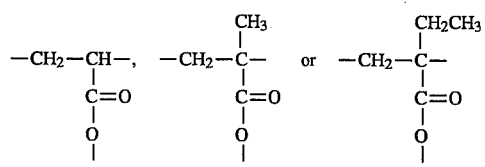

B stands for $-(CH_2)_n-$ or $-(CH_2-CH_2-O)_n-$ (wherein n denotes an integer of from 1 to 20);
A stands for

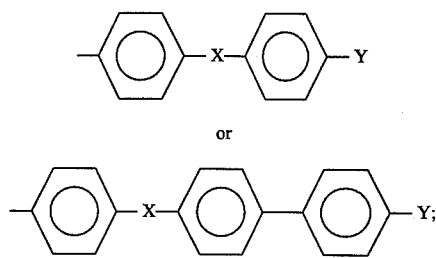

X stands

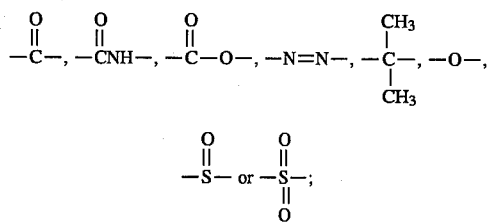

Y stands for $-CN$ or $-OCH_3$:
D stands for

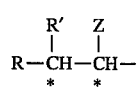

(wherein R and R' are different from each other and independently represent $CH_3$, $C_2H_5$ or $C_3H_7$, and Z represents F, Cl, $-OCH_3$, $-OC_2H_5$ or $-CF_3$;

$R_1$ stands for $CH_3(CH_2)_{n_1}$ (wherein $n_1$ represents an integer of up to 20);

$X_1$ stands for F, Cl or $CF_3$;

$R_2$ stands for $C_{n'}H_{2n'+1}$ (wherein n' represents an integer of from 2 to 20);

$R_3$ stands for $C_1-C_{12}$ alkyl radical;

α stands for $-COO-$ or $-OCO-$;

β and β' independently stand for $-COO-$ or $-OCH_2-$;

γ stands for $-OCO-$ or $-COO-$; and l and m independently stand for an integer of up to 10.

The following is a more detailed description of the invention.

In the polymer matrix of formula (I), E is a main chain, and A, B and D are side chains. A is comprised of a liquid crystalline radical, B takes a role of a spacer radical, and D is comprised of a radical demonstrating dipole moment and having an asymmetric carbon atom.

Illustrative examples of the polymer matrix having the formula (I) are the following (A) to (C);

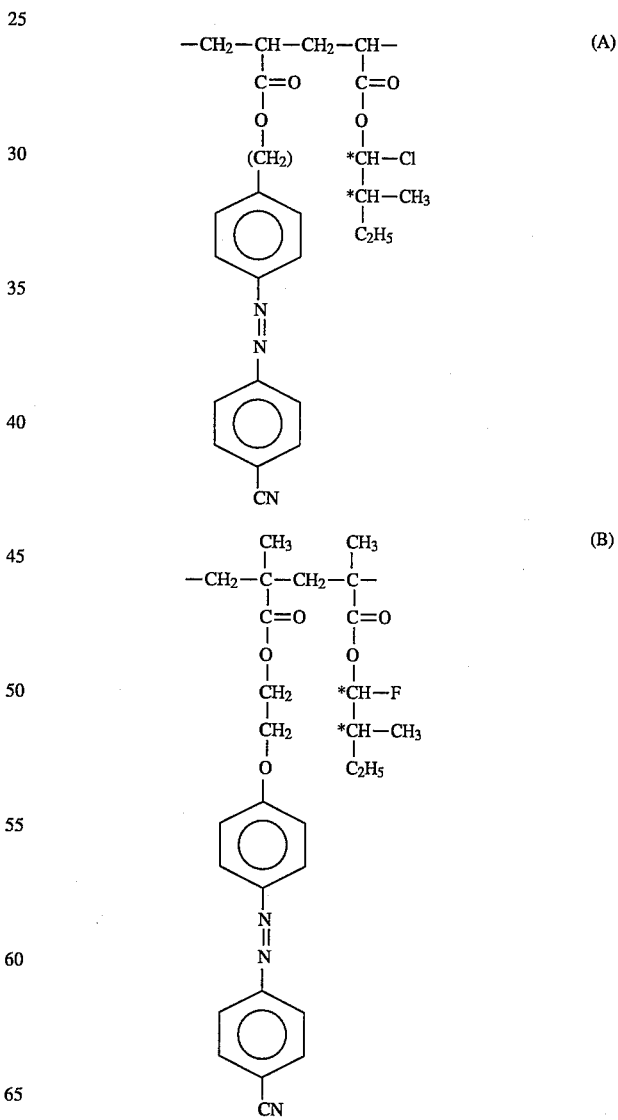

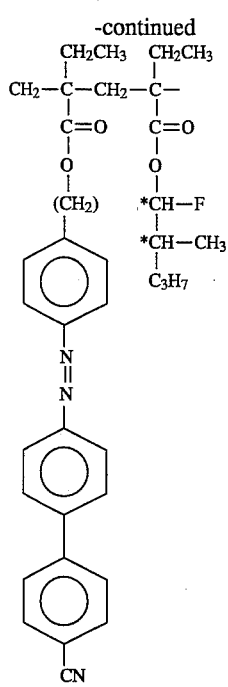
(C)

As described above, in the polymer matrix of formula (I) used in the present invention both of side chains A and B have optical anisotropy and side chain D contains an asymmetric carbon atom. Therefore, if the ferroelectric liquid crystal is dispersed in the polymer matrix, the viewing angle of the present polymeric film is improved by coupling of the ferroelectric liquid crystals with polymeric side chains demonstrating liquid crystalline properties of the polymer matrix, and the response time is also improved by matching the dipole moment of the ferroelectric liquid crystals with that of the polymeric side chains having an asymmetric carbon atom.

Illustrative examples of the ferroelectric liquid crystals of formula (II) or (III) used in the present invention include the following (II-1) through (III-3):

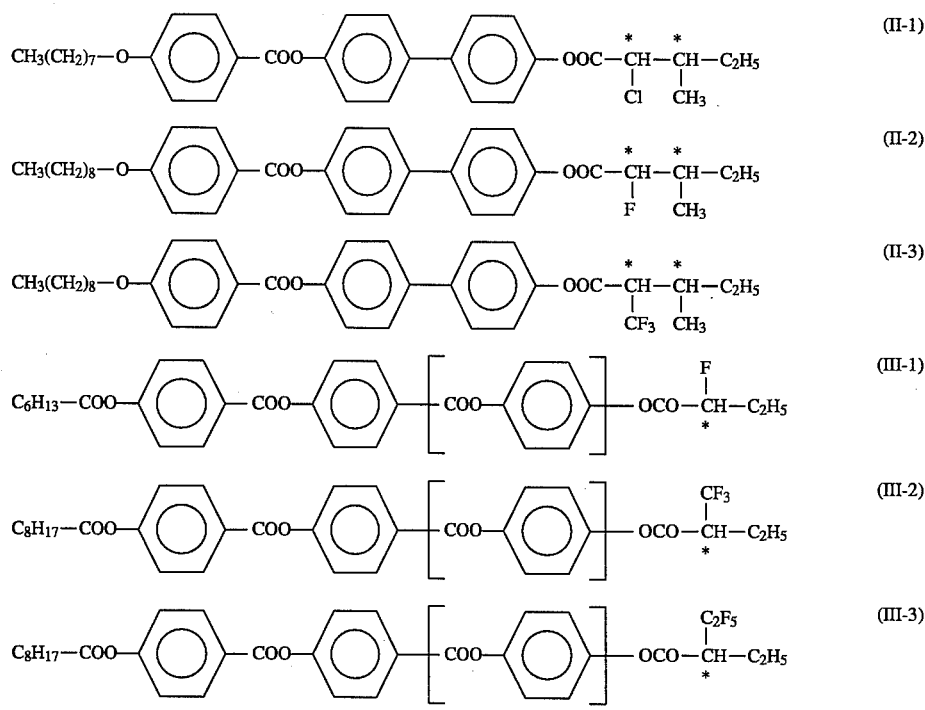

Generally, there are various methods of producing a liquid crystal-dispersed polymeric film by using the polymer matrix and the ferroelectric liquid crystals as mentioned above. First, there is a PIPS (polymerization induced phase separation) method, which comprises mixing a liquid crystal component and a monomer component for the polymer matrix and polymerizing the mixture by curing under UV or increased temperature to produce a liquid crystal-dispersed polymeric film in which phase separation between the liquid crystal and the polymer matrix has been induced. Second, there is a SIPS (solvent induced phase separation) method, which comprises dissolving a liquid crystal component and a polymer matrix component in a solvent, and then removing the solvent from the solution to produce a liquid crystal-dispersed polymeric film having separated phase between the liquid crystal and the polymer matrix. Third, there is a TIPS (thermal induced phase separation) method which comprises heating and fully mixing the mixture of a liquid crystal component and a polymer matrix component at the melting temperature of the polymer component, and then cooling the melted mixture to produce a liquid crystal-dispersed polymeric film having separated phase between the liquid crystal and the polymer matrix.

In the present invention, all of the above mentioned methods may be effectively adopted. However, the following Examples of the present invention will be conducted by way of mainly adopting the PIPS method and SIPS method.

In the preferred embodiment of the present invention, 55% to 70% by weight of polymer matrix of formula (I) is mixed with 30% to 45% by weight of ferroelectric liquid crystals and, if desired, about 5% by weight of UV curing agents. The resulting mixture is coated on the surface of the ITO glass plate and cured under a UV lamp to form a film.

When the liquid crystals-dispersed film is sandwiched between ITO glass plates, the incident light through the liquid crystal cells is scattered, and thus opaque, due to the differences between the refractive index of liquid crystals and that of the polymer matrix. When electric voltages are applied to the film, the liquid crystals align, so that the light is transmitted.

Since the polymer matrix used in the present invention aligns in the same direction as that of the liquid crystals, the viewing angle is highly improved. In addition, since the ferroelectric liquid crystal itself has a wide viewing angle and the side chains have an asymmetric carbon atom and dipole moment are presented in the polymer matrix, the response time is also improved. Furthermore, by dispersing the liquid crystals in the polymer matrix, the liquid crystals are protected from heat and moisture to impart improved durability. Also, since the liquid crystals-dispersed film may take on the role of a polarizer which controls the light, a bright screen can be obtained without the use of a polarizer. In the polymeric film of the present invention, since the polymer matrix encompasses the liquid crystals, even though the film is exposed to UV light, the polymer matrix predominantly absorbs the UV light, and thus, the stability of the liquid crystals is increased. In addition, by the dispersion of liquid crystals in the polymer matrix, the film becomes a form of a solid, and thus, has an advantage in handling ease.

DESCRIPTION OF PREFERRED EMBODIMENTS

Hereinafter, the present invention will be described in detail in the following examples, which should not be construed as limiting the scope of the present invention.

EXAMPLE 1

65 wt % of the polymer monomer mixture of structural formula (A), obtained by copolymerizing p-cyanophenylazobenzylacrylate with 2-methyl- 1-chlorobutylacrylate in the ratio of 50 wt %, 30 wt % of ferroelectric liquid crystalline compound of structural formula (II-1),4-[1-oxo-2-chloro-3-methyl]-pentoxybiphenyl-4-octyloxybenzoate, and 5 wt % of UV curing agent [FC-508, available from Minnesota Mining & Manufacturing] are mixed to give a homogeneous mixture. The resulting mixture is coated on ITO glass, and cured gradually for 30 min. under a UV lamp to obtain a liquid crystal-dispersed polymeric film.

EXAMPLE 2

10 g of p-cyanophenylazophenyloxyethylmethacrylate, 10 g of 2-methyl- 1-fluorobutylmethacrylate and 0.5 g of polymerization initiator (AIBN:2,2'-azobisisobutyronitrile) are dissolved in 100 ml of benzene. The resulting solution is stirred for 4 hours at 50° C. to effect polymerization. After completing the polymerization, the benzene as reaction solvent is removed from the reaction mixture to obtain the polymer matrix of structural formula (B). 0.6 g of the polymer matrix is dissolved in 50 ml of chloroform and is then homogeneously mixed with 0.4 g of the ferroelectric liquid crystalline compound of the structural formula (III-1),4-[4-(2-fluorobutanoyloxy)phenyl] -benzoyl hexanoyloxybenzoate. The resulting mixture is heated at 80° C. to evaporate the chloroform therein to obtain a liquid crystal-dispersed polymeric film.

EXAMPLE 3

0.65 g of the polymer matrix of structural formula (B) prepared by the same method as in Example 2 is dissolved in 50 ml of chloroform and then is homogeneously mixed with 0.35 g of the ferroelectric liquid crystalline compound of structural formula (II-1),4-[1-oxo-2-chloro-3-methyl] pentoxybiphenyl-4-octyloxybenzoate. The resulting mixture is heated at 80° C. to evaporate the chloroform therein to obtain a liquid crystal-dispersed polymeric film.

EXAMPLE 4

0.3 g of p-cyanobiphenylazobenzyl-($\alpha$-ethyl)-acrylate, 0.3 g of 2-methyl-l-fluoropentanyl-($\alpha$-ethyl)-acrylate, 0.35 g of the ferroelectric liquid crystalline compound of the structural formula (II- 1),4-[1-oxo-2-chloro-3-methyl]-pentoxybiphenyl-4-octyloxybenzoate, and 0.05 g of FC-508 as UV curing agent are mixed to give a homogeneous mixture. The resulting mixture is coated on ITO glass, and cured gradually for 30 min. under a UV lamp to obtain a liquid crystal-dispersed polymeric film having a structure which permits dispersing the ferroelectric liquid crystalline compound of structural formula (II-1) in the polymer matrix of structural formula (C).

EXAMPLE 5

10 g of p-cyanobiphenylazobenzyl-($\alpha$-ethyl)-acrylate, 10 g of 2-methyl-l-fluoropentanyl-($\alpha$-ethyl)-acrylate and 0.5 g of polymerization initiator (AIBN) are dissolved in 100 ml of toluene. The resulting solution is stirred for 4 hours at 55° C. to effect polymerization. After completing the polymerization, the toluene reaction solvent is removed from the reaction mixture to obtain the polymer matrix of structural formula (C).

0.6 g of said polymer matrix is dissolved in 50 ml of THF (tetrahydrofurane) and is then homogeneously mixed with 0.4 g of the ferroelectric liquid crystalline compound of structural formula (II-2), 4-[1-oxo-2-fluoro-3methyl]-pentoxy biphenyl-4-nonyloxybenzoate.

The resulting mixture is heated at 85° C. to evaporate the THF therein and obtain a liquid crystal-dispersed polymeric film.

COMPARATIVE EXAMPLE 1

40 wt % of a mixture of ferroelectric liquid compounds [ZLI- 3654 manufactured by Merck, Inc.] and 60 wt % of a mixture comprising 55 mol % of triallylisocyanurate, 41 mol % of pentaerythritoltetrakis (3-mercapto-propionate) and 4 mol % of benzophenone are stirred slowly for 10 min. to give a homogeneous solution. The solution is subjected to a rotating centrifuge for 1 min. to remove bubbles contained therein, and coated on ITO glass. On the coated glass surface, another ITO glass is placed, and cured under a UV lamp to give a liquid crystalline compound-dispersed polymeric film.

The films obtained from Examples 1 to 5 and Comparative Example 1 are tested for response time and viewing angle. The results are listed on the following Table.

TABLE

| Example | Response time (msec) | Viewing angle (°) |
|---|---|---|
| Example 1 | 0.03 | 42 |
| Example 2 | 0.03 | 40 |
| Example 3 | 0.02 | 45 |
| Example 4 | 0.02 | 45 |
| Example 5 | 0.04 | 43 |
| Comparative Example 1 | 3 | 35 |

It will be appreciated by those skilled in the art that although the invention has been illustrated by way of the preferred embodiments thereof, the present invention may be embodied in other specific forms without departing from the spirit or scope thereof.

What is claimed is:

1. A liquid crystal-dispersed polymeric film having improved response properties and view angle, said film comprising a ferro-electric liquid crystalline compound of formula (II) or (III) dispersed in a polymer matrix of formula (I):

$$\begin{array}{c} -E-E- \\ | \quad | \\ B \quad D \\ | \\ A \end{array} \quad (I)$$

$$R_1-O-\phantom{}\bigcirc\phantom{}-COO-\phantom{}\bigcirc\phantom{}-\bigcirc\phantom{}-OOC-\overset{*}{C}H-\overset{*}{C}H-R_2 \quad (II)$$
$$\phantom{R_1-O-\bigcirc-COO-\bigcirc-\bigcirc-OOC-}\underset{X_1}{|}\phantom{CH}\underset{CH_3}{|}$$

$$R_3-\alpha-\bigcirc-\beta-\bigcirc-[(\beta')-\bigcirc]_l-\gamma-\overset{C_mF_{2m+1}}{\underset{*}{|}}CH-R_3 \quad (III)$$

wherein $\overset{*}{C}$ stands for asymmetric carbon;

E stands for $$-CH_2-CH-, \quad -CH_2-\overset{CH_3}{\underset{|}{C}}- \quad or \quad -CH_2-\overset{CH_2CH_3}{\underset{|}{C}}- ;$$
$$\phantom{-CH_2-CH-,}\underset{C=O}{|}\phantom{or}\underset{C=O}{|}\phantom{-CH_2-}\underset{C=O}{|}$$
$$\phantom{-CH_2-CH-,}\underset{O}{|}\phantom{or}\underset{O}{|}\phantom{-CH_2-}\underset{O}{|}$$

B stands for $-(CH_2)_n-$ or $-(CH_2-CH_2-O)_n-$ (wherein n denotes an integer of from 1 to 20);

A stands for $$-\bigcirc-X-\bigcirc-Y$$

or $$-\bigcirc-X-\bigcirc-\bigcirc-Y;$$

X stands for $$-\overset{O}{\underset{\|}{C}}-, \; -\overset{O}{\underset{\|}{C}}NH-, \; -\overset{O}{\underset{\|}{C}}-O-, \; -N=N-, \; -\overset{CH_3}{\underset{\underset{CH_3}{|}}{\overset{|}{C}}}-, \; -O-,$$

$$-\overset{O}{\underset{\|}{S}}- \; or \; -\overset{O}{\underset{\underset{O}{\|}}{\overset{\|}{S}}}-;$$

Y stands for CN or $OCH_3$;
D stands for $$R-\overset{R'}{\underset{*}{\overset{|}{C}H}}-\overset{Z}{\underset{*}{\overset{|}{C}H}}-$$

(wherein R and R' are different from each other and independently represent $CH_3$, $C_2H_5$ or $C_3H_7$, and Z represents F, Cl, $-OCH_3$, $-OC_2H_5$ or $-CF_3$);
$R_1$ stands for $CH_3(CH_2)_{n1}$ (wherein n1 represents an integer of up to 20);
$X_1$ stands for F, Cl or $CF_3$;
$R_2$ stands for $C_{n'}H_{2n'+1}$ (wherein n' represents an integer of from 2 to 20);
$R_3$ stands for $C_1$-$C_{12}$ alkyl radical;
α stands for $-COO-$ or $-OCO-$;
β and β' independently stand for $-COO-$ or $-OCH_2-$;
γ stands for $-OCO-$ or $-COO-$; and
l and m independently stand for an integer of up to 10.

2. A liquid crystal optical display element, comprising the liquid crystal-dispersed polymeric film of claim 1.

3. The liquid crystal-dispersed polymeric film of claim 1 wherein the amount of the polymer matrix of formula (I) is between about 55–70% by weight, and the amount of the ferroelectric liquid crystalline compound of formula (II) or formula (III) is between about 30–45% by weight.

4. A liquid crystal optical display element, comprising the liquid crystal-dispersed polymeric film of claim 3.

5. The liquid crystal-dispersed polymeric film of claim 1 wherein said polymer matrix is a copolymer of p-cyanophenylazo benzylacrylate and 2-methyl-l-chlorobutylacrylate, and said liquid crystalline compound is 4-[1-oxo-2-chloro-3-methyl]pentoxybiphenyl- 4-octyloxybenzoate.

6. The liquid crystal-dispersed polymeric film of claim 1 wherein said polymer matrix is a copolymer of p-cyanophenylazophenyloxyethylmethacrylate and 2-methyl-l-fluorobutylmethacrylate, and said liquid crystalline compound is 4-[4-(2-fluorobutanoyloxy)phenyl] -benzoyl hexanoyl oxybenzoate.

7. The liquid crystal-dispersed polymeric film of claim 1 wherein said polymer matrix is a copolymer of p-cyanophenylazophenyloxyethylmethacrylate and 2-methyl-1-fluorobutylmethacrylate, and said liquid crystalline compound is 4-[1-oxo-2-chloro-3-methyl] -pentoxybiphenyl-4-octyloxybenzoate.

8. The liquid crystal-dispersed polymeric film of claim 1 wherein said polymer matrix is a copolymer of p-cyanobiphenyl azobenzyl-(α-ethyl)-acrylate and 2-methyl-1-fluoropentanyl-(α-ethyl)-acrylate, and said liquid crystalline compound is 4-[1-oxo 2-chloro-3-methyl]-pentoxybiphenyl-4-octyloxybenzoate.

9. The liquid crystal-dispersed polymeric film of claim 1 wherein said polymer matrix is a copolymer of p-cyanobiphenyl azobenzyl-(α-ethyl)-acrylate and 2-methyl-1-fluoropentanyl-(α-ethyl)-acrylate, and said liquid crystalline compound is 4-[1-oxo- 2-chloro-3-methyl]-pentoxybiphenyl-4-nonyloxybenzoate.

10. Method of preparing a liquid crystal-dispersed polymeric film having improved response properties and view angle, which comprises mixing a ferroelectric liquid crystalline compound of Formula (II) or (III):

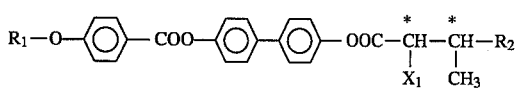 (II)

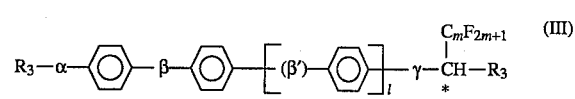 (III)

wherein $\overset{*}{C}$ stands for asymmetric carbon;
$R_1$ stands for $CH_3(CH_2)_{n1}$ (wherein n1 represents an integer of up to 20);
$X_1$ stands for F, Cl or $CF_3$;
$R_2$ stands for $C_{n'}H_{2n'+1}$ (wherein n' represents an integer of from 2 to 20);
$R_3$ stands for $C_1$-$C_{12}$ alkyl radical;
α stands for —COO— or —OCO—;
β and β' independently stand for —COO— or —OCH$_2$—;
γ stands for —OCO— or —COO—; and
l and m independently stand for an integer of up to 10;
and polymerizable monomers for a polymer matrix of Formula (I),

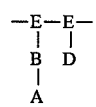 (I)

wherein E stands for:

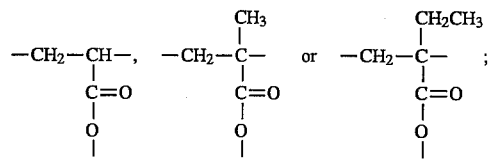

B stands for —(CH$_2$)$_n$— or —(CH$_2$—CH$_2$—O)$_n$— (wherein n denotes an integer of from 1 to 20);
A stands for

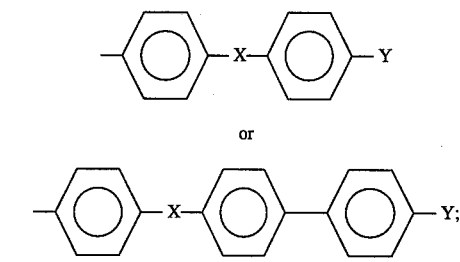

X stands for

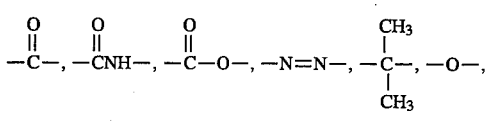

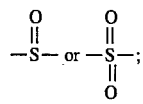

Y stands for CN or OCH$_3$;
D stands for

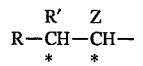

(wherein R and R' are different from each other and independently represent $CH_3$, $C_2H_5$ or $C_3H_7$, and Z represents F, Cl, —OCH$_3$, —OC$_2$H$_5$ or —CF$_3$);
to obtain a homogenous mixture, and polymerizing the monomers of said homogenous mixture by curing under UV or increased temperature to produce a film having separated phase between the liquid crystal and the polymer matrix.

11. Method of preparing a liquid crystal-dispersed polymeric film having improved response properties and view angle, which comprises dissolving a ferroelectric liquid crystalline compound of Formula (II) or (III):

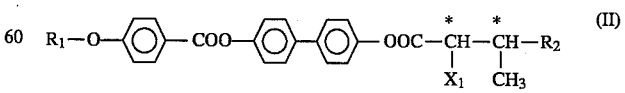 (II)

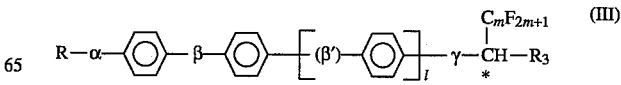 (III)

wherein $\overset{*}{C}$ stands for asymmetric carbon;

$R_1$ stands for $CH_3(CH_2)_{n1}$ (wherein n1 represents an integer of up to 20);
$X_1$ stands for F, Cl or $CF_3$;
$R_2$ stands for $C_{n'}H_{2n'+1}$ (wherein n' represents an integer of from 2 to 20);
$R_3$ stands for $C_1$-$C_{12}$ alkyl radical;
α stands for —COO— or —OCO—;
β and β' independently stand for —COO— or —OCH$_2$—;
γ stands for —OCO— or —COO—; and
l and m independently stand for an integer of up to 10; and a polymer matrix of Formula (I), $$\begin{array}{c} -E-E- \\ | \quad | \\ B \quad D \\ | \\ A \end{array} \quad (I)$$

wherein E stands for:

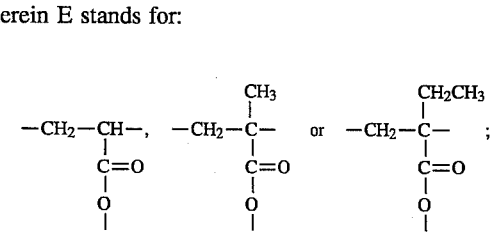

B stands for —(CH$_2$)$_n$— or —(CH$_2$—CH$_2$—O)$_n$— (wherein n denotes all integer of from 1 to 20);
A stands for

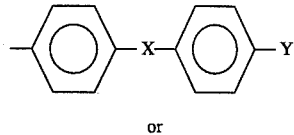

or

X stands for

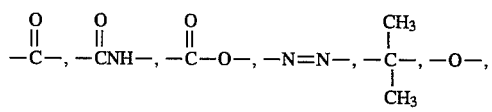

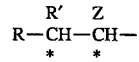

Y stands for CN or OCH$_3$;
D stands for

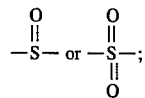

(wherein R and R' are different from each other and independently represent CH$_3$, C$_2$H$_5$ or C$_3$H$_7$, and Z represents F, Cl, —OCH$_3$, —OC$_2$H$_5$ or —CF$_3$);
in a solvent, and then removing the solvent from the solution to produce a film having separated phase between the liquid crystal and the polymer matrix.

12. Method according to claim 10 or 11, wherein said ferroelectric liquid crystal is present in an amount of about 30–45% by weight, and wherein said polymer matrix is present in an amount of about 55–70% by weight.

* * * * *